Patented Mar. 6, 1928.

1,661,293

UNITED STATES PATENT OFFICE.

FREDERICK H. KRANZ, OF BUFFALO, NEW YORK, ASSIGNOR TO NATIONAL ANILINE & CHEMICAL CO., INC., OF NEW YORK, N. Y., A CORPORATION OF NEW YORK.

PRODUCTION OF AROMATIC KETONIC COMPOUNDS.

No Drawing.　　　Application filed April 2, 1926. Serial No. 99,406.

This invention relates to the manufacture and production of 4.4'-diaminodiarylketonic bodies.

It is well known that 4.4'-diaminodiarylketonic bodies can be prepared by heating 4.4'-diaminodiarylmethane bodies with crystallized sodium sulfide and sulfur in a reflux apparatus. If an N-substituted 4.4'-diaminodiarylmethane body is employed, the corresponding N-substituted 4.4'-diaminodiarylthioketone body is produced whereas if a 4.4'-diaminodiarylmethane body not substituted in the amino groups be employed then the corresponding 4.4'-diaminodiarylketone body is obtained. In practicing this known process it appears advisable to employ crystallized sodium sulfide since dry commercial sodium sulfide gives a poorer yield and a product of inferior quality.

According to the present invention, the relatively expensive crystallized sodium sulfide is replaced by caustic alkali which offers not only considerable economy in cost but there is produced by its use an excellent product and in superior yields.

In carrying out the present invention, the 4.4'-diaminodiarylmethane body is heated with a caustic alkali solution containing sulfur under a reflux condenser until the methane body has been substantially all converted to the corresponding ketone body. Under the term ketone body there is included both the ketones and the thioketones.

The following specific examples will further illustrate the invention, but it will be understood that the invention is not limited thereto. The parts are by weight.

*Example 1.*—To 300 parts of a fifty percent caustic soda solution, at a temperature of about 50° C. and under good agitation, about 105 parts of powdered sulfur are added; the temperature rises to about 80–85° C. When it drops to about 70° C. about 215 parts more of sulfur are added, and the temperature again rises to about 80° C. and gradually falls. When the temperature has fallen to about 70° C., 200 parts of tetramethyl-4.4'-diaminodiphenylmethane, $(CH_3)_2N—C_6H_4—CH_2—C_6H_4N(CH_3)_2$ are added and the mixture is then heated to about 120° C. The mixture is stirred at this temperature for about 45 minutes, after which it is heated to vigorous boiling under a reflux, which boiling should begin at a temperature of about 126° C. The boiling temperature increases to about 127–128° C. within the next three hours, and it is there maintained while the mixture is agitated for about 72 hours or until the reaction is completed. At the completion of the reaction, about 500 parts of water are added, and the mixture is poured into about 2500 parts of water kept at a temperature below 25° C. and agitated for about 30 minutes, and the 4.4'-tetramethyldiaminodiphenylthioketone is filtered off and washed well with water. The remaining products of the reaction are mainly hydrogen sulfide, which is removed during the vigorous boiling, and sodium thiosulfate which is carried off in solution. Substantially no, or very little, sodium sulfide or polysulfide is present in the solution at the completion of the reaction. By this procedure a yield of superior quality of about ninety percent of the theoretical is obtainable.

*Example 2.*—A mixture of 150 parts caustic soda, 320 parts sulfur, 150 parts water and 100 parts of 4.4'-diaminodiphenylmethane, $H_2N—C_6H_4—CH_2—C_6H_4—NH_2$, are slowly heated with good agitation to about 120° C. over a period of about 35–45 minutes and then vigorously boiled over a period of about 72 hours or until the methane has substantially or completely disappeared. At the completion of the reaction, 1000 parts of water are added and the product filtered off and washed well with water. If desired, the 4.4'-diaminodiphenylketone thus obtained may be purified in any suitable manner, for example, by dissolving it in dilute hydrochloric acid, filtering, and then slowly adding to the filtrate a dilute solution of caustic soda in an amount not quite sufficient to make the solution alkaline. The precipitated ketone is filtered off and washed with water.

The proportions given by way of exemplification can be varied. A caustic soda concentration less than fifty percent apparently has little effect other than on the yield; but with higher concentrations, about sixty percent or more, the reaction does not go to completion and undersirable decomposition products begin to form. The sulfur content also can be altered, but for best results the amount of sulfur should be substantially sufficient to form the thioketone and to convert all the sodium hydroxide into a thiosulfate. Upon the addition of sulfur to the caustic soda at temperatures substantially below 120° C., it is found that the sulfur is largely present as free sulfur when the methane derivative is added; this uncombined condition of the sulfur, prior to the addition of the methane derivative, is further evidenced by the necessity of holding the mixture at about 120° C. for an extended period before raising to boiling, a reaction between the caustic soda and sulfur apparently occuring at this temperature. The temperature at which the mixture boils varies with the caustic soda concentration; with a fifty percent solution, the temperature is about 127°–128°C., but with more dilute caustic soda solutions the boiling point is correspondingly lower. Agitation throughout the whole process is of importance in securing a uniform reaction and avoiding overheating; and vigorous boiling while refluxing is going on is desirable for removing the hydrogen sulfide as rapidly as it is formed and thus preventing the formation of mercaptans and other by-products.

I claim:

1. A process for the production of a 4.4'-diaminodiarylketone body which comprises heating a 4.4'-diaminodiarylmethane body with caustic alkali and sulfur.

2. A process for the production of a 4.4'-diaminodiarylketone body which comprises subjecting with agitation a 4.4'-diaminodiarylmethane body to the action of a caustic alkali solution containing sulfur at a refluxing temperature.

3. A process for the production of a 4.4'-diaminodiarylketone body which comprises subjecting with agitation a 4.4'-diaminodiarylmethane body to the action of a fifty percent solution of caustic alkali containing sulfur at a refluxing temperature.

4. A process for the production of a 4.4'-diaminodiphenylketone body which comprises subjecting a 4.4'-diaminodiphenylmethane body to the action of caustic alkali containing sulfur with vigorous boiling and vigorous agitation.

5. A process for the production of a 4.4'-diaminodiphenylmethane body which comprises subjecting a 4.4'-diaminodiphenylmethane body to the action of caustic alkali containing sufficient sulfur to form a thioketone and to convert the caustic alkali to a thiosulfate.

6. A process for the production of 4.4'-diaminodiphenylthioketone body which comprises adding sulfur to caustic soda at a temperature substantially less than 120° C., admixing an N-substituted 4.4'-diaminodiphenylmethane, maintaining said mixture for a period of time at a temperature approximating 120° C., and thereupon subjecting the mixture to a vigorous refluxing temperature.

7. A process for the production of 4.4'-tetramethyldiaminodiphenylthioketone which comprises heating tetramethyldiaminodiphenylmethane with caustic alkali containing sulfur.

8. A process for the production of 4.4'-tetramethyldiaminodiphenylthioketone which comprises boiling with agitation under a reflux a mixture of approximately ten parts of 4.4'-tetramethyldiaminodiphenylmethane and fifteen parts of a fifty percent caustic soda solution containing approximately sixteen parts of sulfur.

In testimony whereof I affix my signature.

FREDERICK H. KRANZ.